United States Patent [19]

Li

[11] 3,950,734
[45] Apr. 13, 1976

[54] LANGUAGE PROCESSING SYSTEM

[76] Inventor: Tzu-Hung Li, 362 Ying-Chu Five Ts'un, Nei Hu, Taipei, China /Taiwan

[22] Filed: Aug. 16, 1973

[21] Appl. No.: 388,957

[52] U.S. Cl. .............................. 340/172.5; 197/1 A
[51] Int. Cl.² ........................................... G06F 3/02
[58] Field of Search............ 179/1 R, 1 A; 235/145, 235/146; 340/324 A, 324 AD, 365, 172.5; 178/21, 27, 30, 79–81, 113, 17 A, 17 C; 197/1 A

[56] References Cited
UNITED STATES PATENTS

| | | | |
|---|---|---|---|
| 2,974,193 | 3/1961 | Yamura et al. | 197/1 A |
| 3,325,786 | 6/1967 | Shashoua et al. | 340/172.5 |
| 3,381,276 | 4/1968 | James | 340/172.5 |
| 3,394,368 | 7/1968 | Carr et al. | 340/365 |
| 3,665,450 | 5/1972 | Leban | 340/324 A |
| 3,809,203 | 5/1974 | Ogawa et al. | 197/1 A |

Primary Examiner—Harvey E. Springborn
Attorney, Agent, or Firm—Lane, Aitken, Dunner & Ziems

[57] ABSTRACT

A system for encoding Chinese characters in which each character is divided into a prefix and a suffix each related to one of 10 primary character elements. The prefixes for all Chinese characters are organized in 10 groups corresponding to the primary character elements. Each group is further divided into another 10 units providing 100 consecutively numbered divisions of prefixes. The suffixes are similarly allotted to 100 numerals based on their relationship to the ten primary character elements. Using a keyboard with 100 keys, any given Chinese character can be specified by two keystrikes. The first keystrike corresponds to the prefix and the second keystrike corresponds to the suffix of the Chinese character. Identifying the unique composite code for any given Chinese character is simplified by recognition of the prefix or suffix as a member of a family of prefixes or suffixes based on one of the 10 primary character elements.

3 Claims, 11 Drawing Figures

LANGUAGE PROCESSING SYSTEM

BACKGROUND OF THE INVENTION

In this greatly progressing, information-oriented age, character data processing systems, especially for computers, have been expanding their fields of application day by day and are fast becoming indispensable to our daily life. Although the speed of information transmission and abundance of information contained in Chinese characters exceed that of any western language characters, the encoding and printing of Chinese data remains a very complicated process because of the great volume of characters, and the complicated two-dimensional construction of each character.

Chinese data processing systems have recently been commercialized. To print out a desired character with these systems, the operator must index it from thousands of keys on an input keyboard and operate the keys at least twice. A computer handling data encoded in this manner must store all of the information concerning the various styles of Chinese characters. Taking ten thousand commonly used Chinese characters, for example, if each character is stored by a 16 × 16 dot matrix, the total number of bits of storage required is $2.56 \times 10^6$ bits. This system therefore is not only inconvenient for input encoding but also extremely expensive.

SUMMARY OF THE INVENTION

The main object of the present invention is to provide a simplified input and output system for universal language data processing which is compatible with Chinese, Japanese and western languages to overcome the shortcomings of the prior art.

Another object of the present invention is to provide a simplified input keyboard on which Chinese characters are represented in accordance with a system for classifying the structure of each character providing a hundred prefix and suffix combinations in rows and columns identified respectively with indexing codes, permitting any Chinese character to be indicated by two keystrikes on the input keyboard.

A further object of the invention is to provide an input and output device for Chinese character data processing systems in which Chinese characters in a 100 × 100 character pattern or matrix are reduced through a microfilm process and provided on a reel of film whereby each Chinese character may be selectively printed out through a phototype system.

Another object of the invention is to increase the speed and accuracy of Chinese character data processing systems.

Still another object of the invention is to provide a keyboard for Chinese character data processing in which the arrangement of English alphabet keys is identical to that of a conventional typewriter without requiring an additional keyboard exclusively for the English alphabet.

A further object of the invention is to provide an input and output device for typewriters, telegraphic systems, telex systems, and teletypewriters used in photocomposing systems and phototype-setting systems for universal language processing.

A still further object of the invention is to provide an input and output device for language data processing which offers a wide selection of character styles through a practically unlimited volume of character storage and is easy to learn how to operate as well as inexpensive to manufacture.

These and other objects of the invention are accomplished through the discovery and implementation of a special classification system for Chinese characters which is applicable in a similar manner to other languages. Briefly, each character is broken down into a prefix and a suffix each related by its style and manner of writing to one division of a family of prefixes based on one of 10 primary character elements designated by the numerals 0–9. The number associated with each primary character element is easily remembered by virtue of the fact that most of the primary character elements are logically related to their respective numerals. All of the Chinese characters are graphically arranged in a square matrix having 100 consecutively numbered rows and 100 consecutively numbered columns. Thus each Chinese character can be represented by four decimal digits, the first and last pairs of digits corresponding respectively to the column and row. The indicated Chinese character corresponds to the intersection of the designated column and row. The numerals indicating the columns are divided into ten consecutive groups. Each group of 10 columns corresponds to a family of prefixes based on a single primary character element, there being ten primary character elements. In a similar manner, the consecutive rows are divided into 10 consecutive groups of suffixes based respectively on the same 10 primary character elements on which the prefixes are based.

A keyboard for utilizing this system includes an array of 100 consecutively numbered keys corresponding to the numbered rows and columns. The keys can represent either a Chinese prefix or suffix depending on the order in which they are struck. In order to encode one whole Chinese character, the typist first identifies the prefix in the structure of the character and relates that prefix first to one of the primary character elements and then to one of the 10 divisions of the family of prefixes associated with or based on that primary character element. Thus if the prefix were related to the fourth division of the prefix family associated with the third character element, to designate the prefix the typist would strike the key bearing the number 34. In a similar manner the typist would identify the remainder of the whole Chinese character as a suffix belonging to one division of a family of suffixes based on one of the primary character elements. For example, if it were based on the fifth character element, the typist would next strike the key bearing the number 57. With these two keystrikes completed, the whole Chinese character would be encoded. Decoding the four digit number associated with the character is, of course, a simple operation because there is a one-to-one correspondence between the four digit numbers and whole Chinese character.

The keyboard according to the invention can also be used to represent a plurality of languages including Chinese. For this arrangement the same 100 keys used to specify the Chinese characters are also used to designate characters in other languages. Each key bears a plurality of characters as well as the two digit number used to identify prefixes and suffixes of the Chinese characters. Access to alphabets in other languages represented by the keys is provided by auxiliary designator keys. If the designator key for the Chinese language is depressed, the keyboard represents the suffix and prefix organization of the Chinese language. However, if the English key is pressed, the keyboard takes on a new identity as that of an English typewriter, for which use, 26 of the keys are arranged in the conventional manner correspond to the English alphabet. Thus, the English alphabet keys form a special subset of the 100 keys required for the Chinese character keyboarding.

A preferred printing system utilizing the keyboard according to the invention as an input source includes a drum carrying ring-like strips of film on which Chinese characters, for example, are arranged. When a particular character from the rotating set of characters is designated after the second key stroke in the Chinese data processing system, the drum comes to a stop and a flash lamp projects an image of the selected character onto a print film. Means are provided for moving the print film in two orthogonal directions to locate the selected character at a certain position on the print film.

BRIEF DESCRIPTION OF THE DRAWINGS

FIGS. 3, 3A, 3B, 3C form a chart representing the Japanese-style character matrix according to the invention, similar to the Chinese matrix in FIG. 1.

DESCRIPTION OF THE PREFERRED EMBODIMENTS

Based on more than a decade of research into the nature of the composition of Chinese characters, it has been discovered that the Chinese written language is basically composed of various kinds of primary character elements. Each character represents a combination of a plurality of these primary character elements or variants thereof in a square or rectangular pattern. Chinese characters differ substantially from written western languages in that the arrangement of each character is two-dimentional rather than linear or serial as in English. The set of basic strokes for composing Chinese characters is comparable to the alphabets of western languages.

Figure 1:
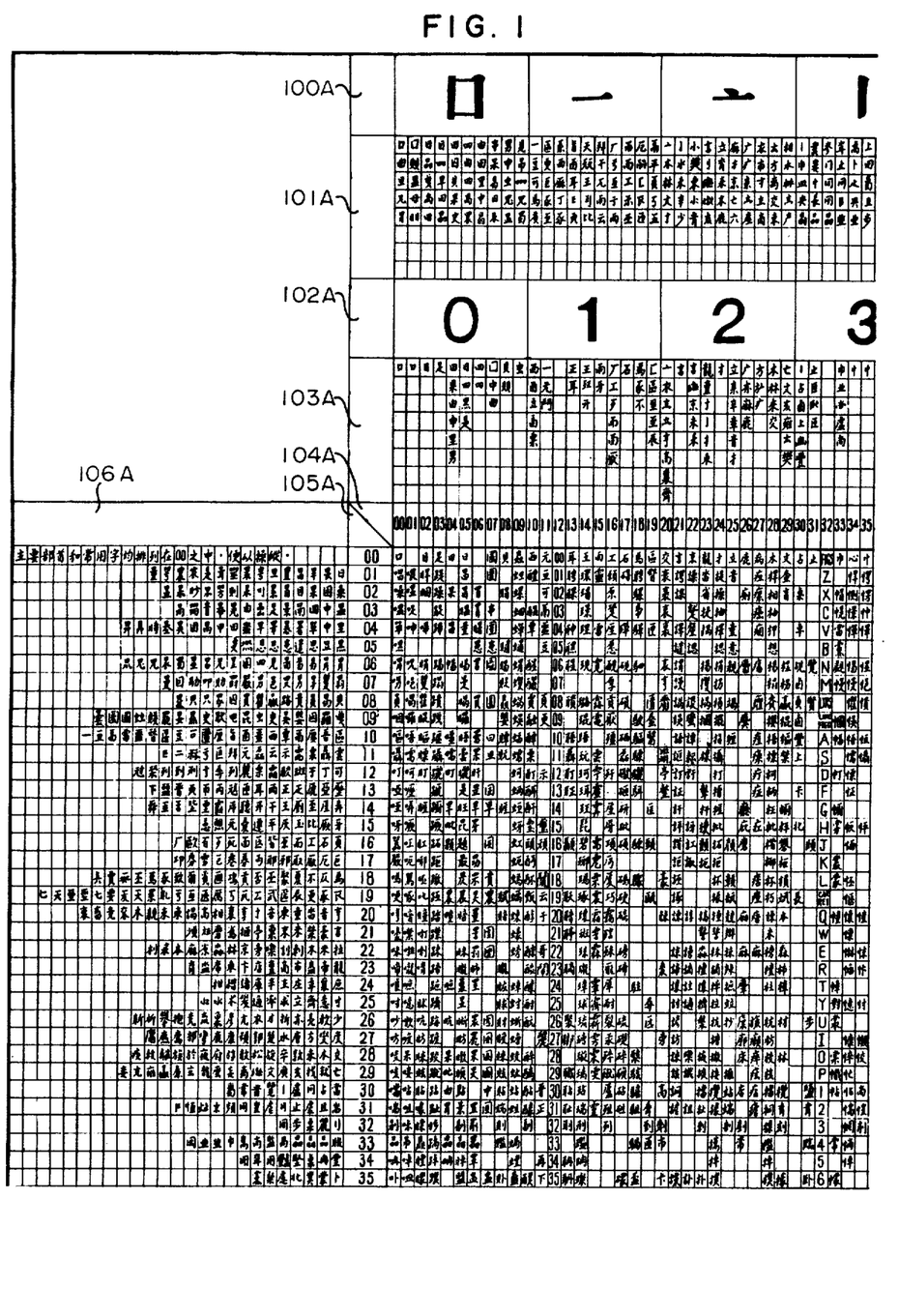
FIGS. 1, 1A, 1B, 1C form a chart representing the Chinese character matrix according to the invention.
Figure 1A:
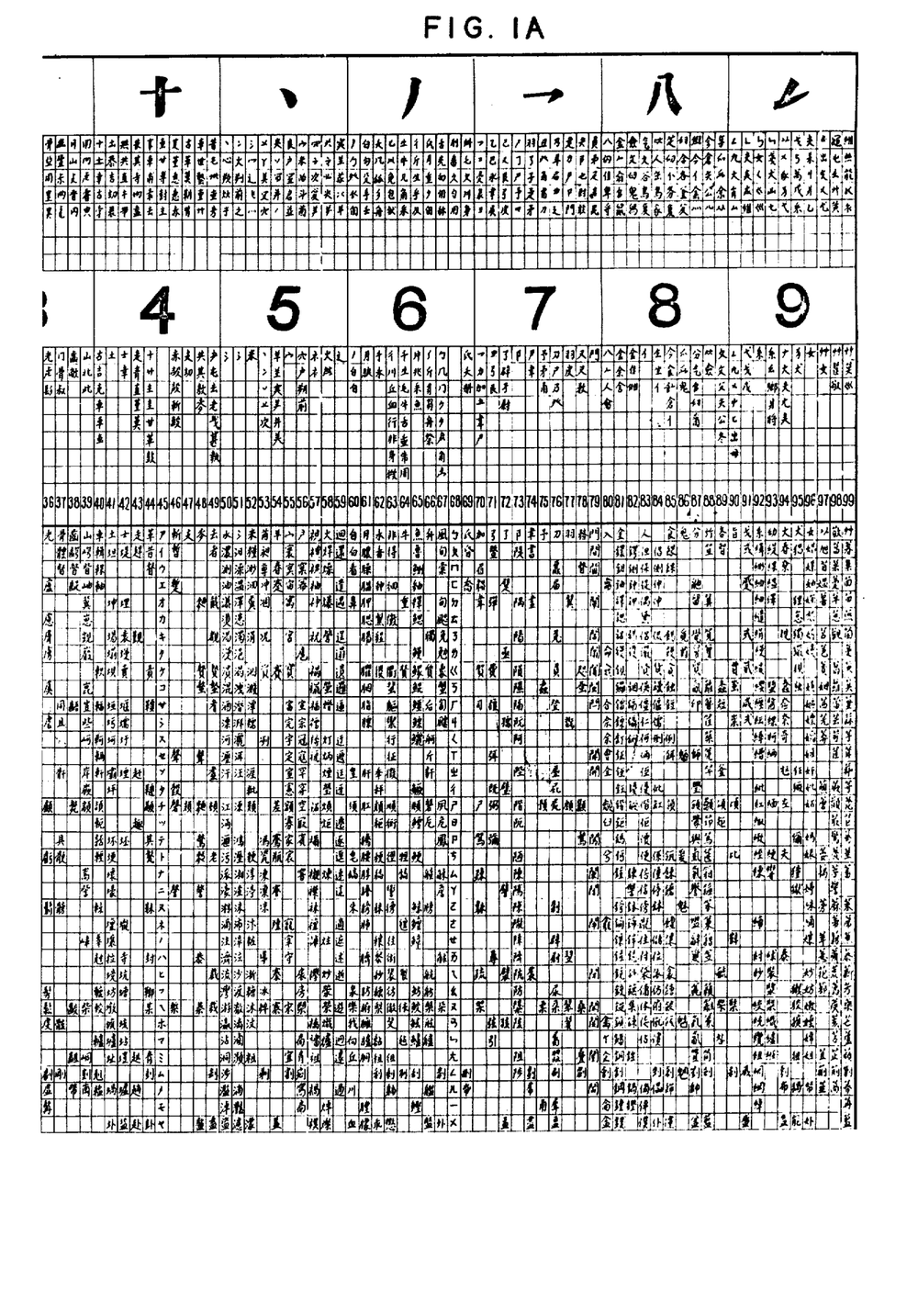
Figure 1B:
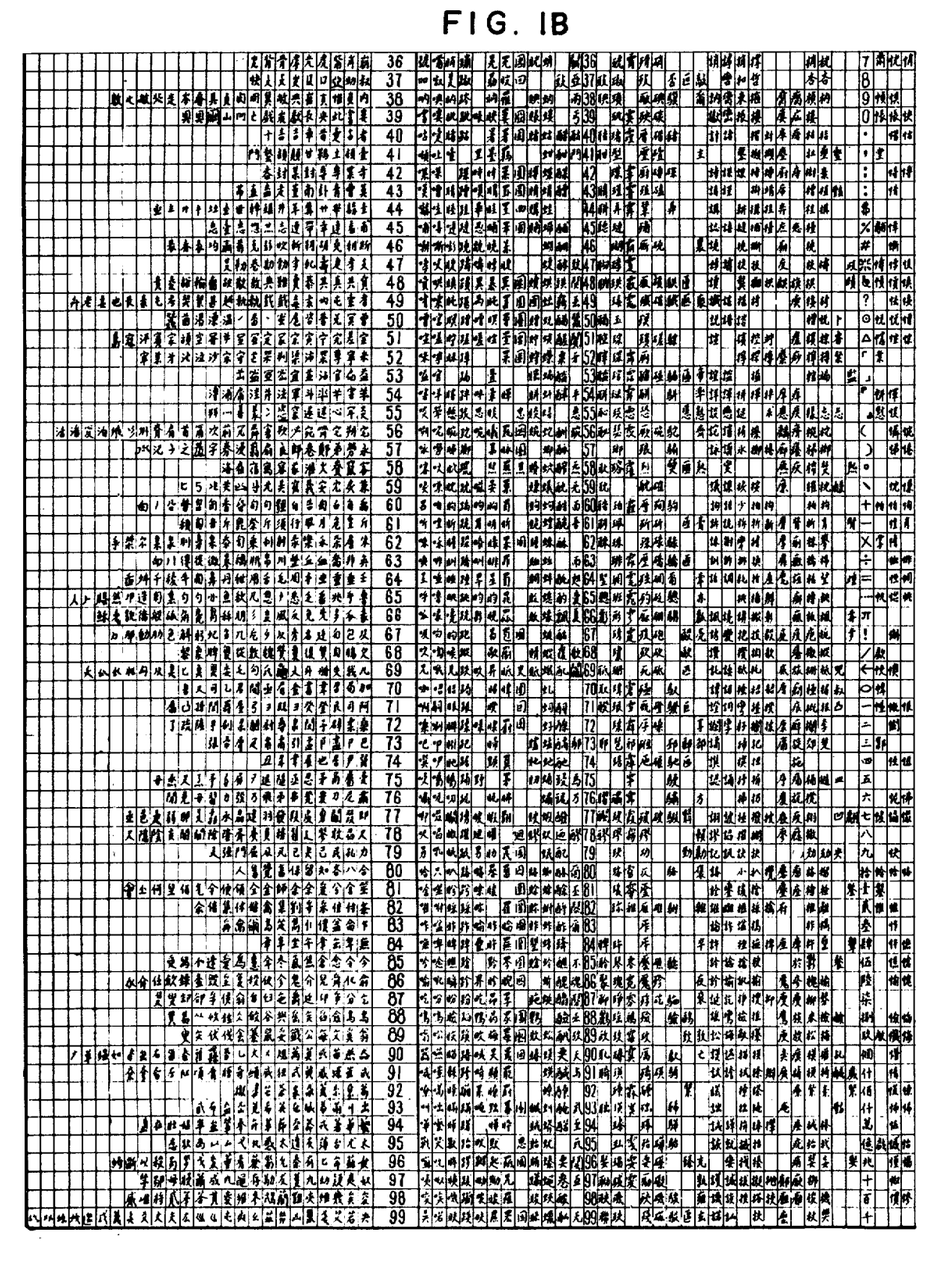
Figure 1C:
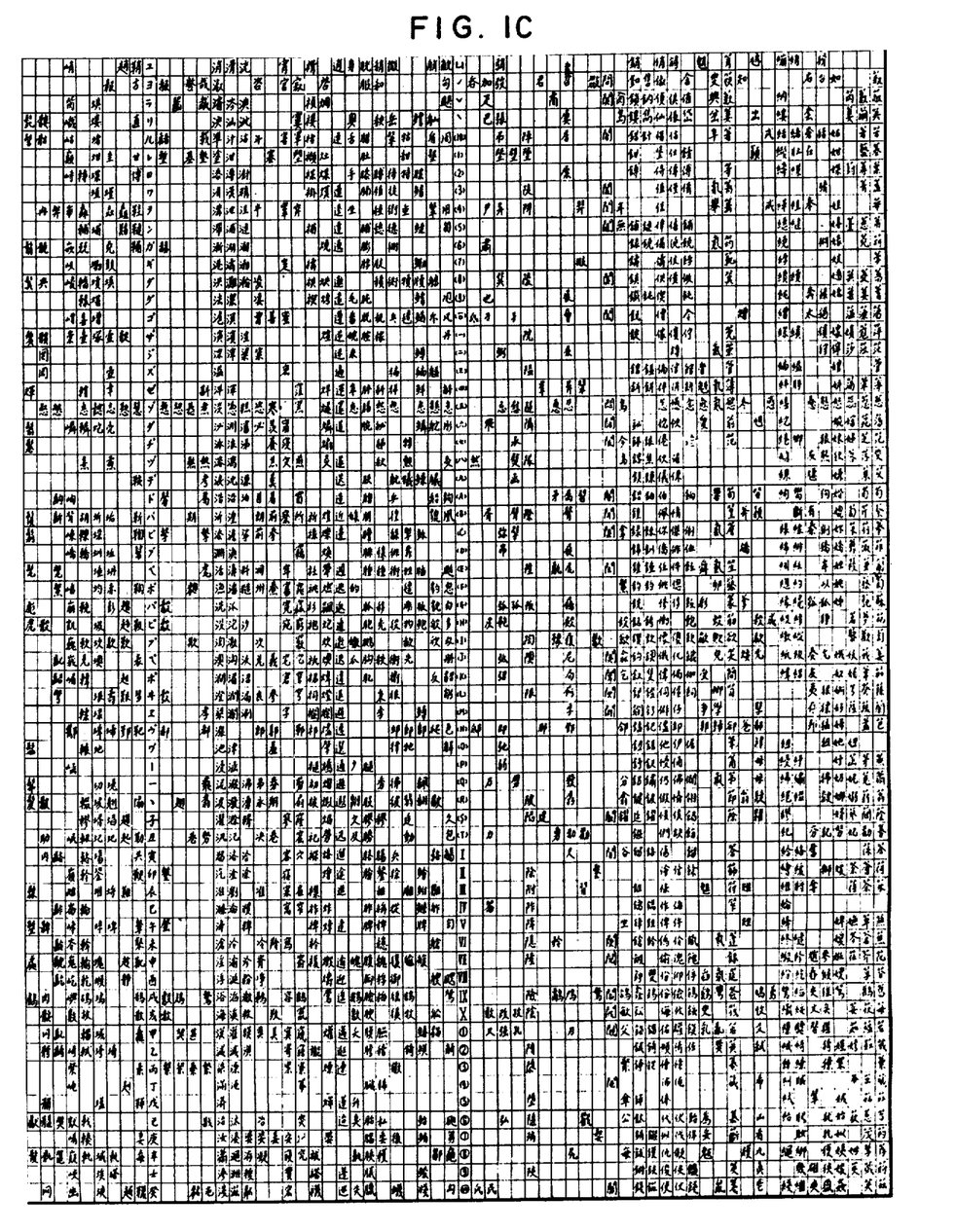

Based on the style of Chinese character writing known as Roman or block style, the standard writing form taught in Chinese schools, it has been discovered that there are 10 primary character elements on which all Chinese characters are based. These primary elements are shown in FIG. 1 as row 100A. Each primary element in row 100A is given a corresponding numeral 0–9 as shown in row 102A. Accept for three of the primary elements, the elements correspond logically to the numerals by which they are designated. For example, the box-shaped element in row 100A corresponding to "0" actually means "mouth" in Chinese and is similar to the shape of the numeral "0". Similarly the horizontal line or "dash" associated with the numeral 1 is graphically similar to the numeral. The symbol designated by the numeral "2" is identical to the Chinese numeral character "2". The symbol which looks like a plus sign represents the intersection of four directions and corresponds to the numeral "4". The symbol associated with the numeral "7" means "warping" and its shape is similar to the numeral. The symbol designated "8" is identical to the corresponding Chinese numeral character. The last symbol designated "9" means "hook" and represents the Chinese meaning of the numeral "9". The symbols associated with the numerals 3, 5 and 6 are arbitrarily assigned and are called respectively "upright", "dot" and "skim".

Row 101A in FIG. 1 represents respective groups of roots, radicals or variants of each of the primary character elements in row 100A. Row 103A represents a family of prefixes for Chinese characters associated with each primary character element. Each family associated with a single character element is further divided into 10 divisions and each division from left to right is respectively given an individual indexing code from 00 to 99 spanning all 10 of the primary character element groups. These two-digit codes serve as the prefix codes of the Chinese characters as shown in row 104A. Thus each two-digit number in the row 104A identifies a single column in the 100 × 100 matrix of whole Chinese characters arranged beneath the row 104A. Accordingly, there are 100 columns of such characters in the matrix.

In a like manner, the suffixes 106A of Chinese characters are also organized into ten families of suffixes based on the corresponding primary character elements of row 100A and each family is further divided into ten divisions of suffixes. Each consecutive division of suffixes is respectively given an individual two-digit indexing code from 00 to 99 as shown in column 105A. Column 105A identifies one hundred rows of whole Chinese characters in the matrix defined by the intersection of the columns designated by the numerals in 104A and the rows designated by the numerals in column 105A.

Each whole Chinese character among the ten thousand character spaces of the matrix corresponds to one two-digit number in the prefix codes 104A and another two-digit number in the suffix codes 105A. Conversely, by combining any two prefix and suffix codes, a complete Chinese character is designated among the characters in the entire matrix.

The composition of each family of prefixes or suffixes under a particular primary character element is also based on a pair of primary character elements in the usual case. The assignment of the prefix to one of the two primary character elements from which the prefix is essentially formed, is based on the conventional order in which the strokes in the prefix are written by hand. Take the prefix 十 meaning "cross", for example. The symbol is ordinarily written from the top to the bottom so that the first handwritten strokes correspond to the primary character element No. 2. The lower portion of the prefix is written next and corresponds to the primary character element 8 in its basic form. Therefore the prefix code is 28 and this particular prefix is shown in column 28 among the eighth division of the family of prefixes for primary character element No. 2. The prefix 古 means ancient, and again the top portion of the symbol is written first and corresponds to the symbol in row 100A designated No. 4. The lower portion of the symbol corresponds to the primary character element meaning mouth in row 100A, designated primary character element "0". Thus, the prefix indexing code for the prefix meaning ancient will be 40 as shown in column 40 among the prefixes in the 0th division of the prefix family associated with the cross mark, No. 4.

The same system is applied to the suffixes. For example, for the suffix 目, the representative code for the top portion of the symbol is 0 and the code for the lower portion of the symbol is 6. Thus the suffix indexing code is 06 and this particular suffix is found among the row of suffixes in column 106A associated with the suffix code 06 in column 105A. In another example, for the suffix 阝, the first handwritten stroke corresponds to the primary character element 3 and the next handwritten strokes of the symbol correspond to thhe character element 8. Thus the indexing code for this suffix is 38. Any Chinese character can be simply indexed through the teaching of the arrangement of the prefixes and suffixes in accordance with the present invention.

Let us take a complete Chinese character 譯 meaning "translation", and relate it to its corresponding prefix and suffix codes in FIG. 1. The symbol is basically written from left to right with the left-hand portion of the symbol thus representing the prefix and the right-hand portion of the symbol representing the suffix. For the prefix portion, the indexing code is 21, its first handwritten strokes corresponding to the code 2 and the next handwritten stroke corresponding to code 1. The right-hand symbol in the word translation represents a suffix for which the indexing code is 04, the first handwritten strokes corresponding to the 0 primary character element and the next handwritten strokes corresponding to the primary character element 4. Accordingly, this particular character will appear in the matrix at the intersection of the column designated by the prefix code 21 and the row designated by the suffix code 04 in FIG. 1. Comparing the whole Chinese character with the corresponding English word translation, it is recognized that the prefix corresponds to the prefix "trans", the upper portion of the suffix corresponds to "la" and the lower portion of the suffix corresponds to "tion". In this manner, any Chinese character can be readily learned from what its indexing codes are in accordance with the principle discussed above. It is believed that this indexing method is the most convenient and useful of all of the current indexing techniques for Chinese characters. For example, it is far more functional than the 4800 character pattern tabulation method of dictionary indexing taught by Chung-Chin Kao in the prior art.

Figure 2:
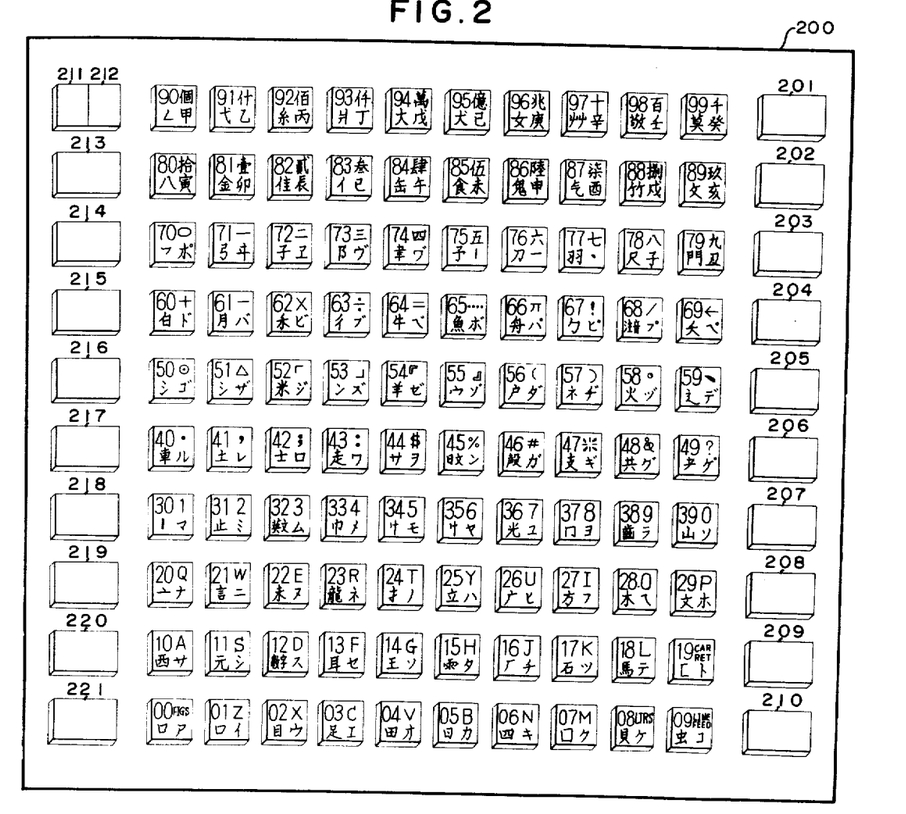
FIG. 2 is a schematic representation of a plan view of the input keyboard according to the invention utilizing the system illustrated by the matrix of FIG. 1.

FIG. 2 shows an embodiment of a keyboard 200, used in practicing the invention. In order to encode and print out whole Chinese characters by means of the keyboard, one hundred consecutively numbered keys (from left to right, bottom to top) are arranged in a 10 × 10 array on the keyboard 200. Individual actuation of the keys produces distinct electrical outputs in the conventional manner. Each one of the keys 00–99 denotes a particular prefix or suffix code corresponding to the codes 104A and 105A in FIG. 1 depending on the order in which the keys are struck. For example, the keys in the bottom row designated 00–09 correspond either to the prefix code 00–09 or to the suffix codes 00–09 associated with the primary character element "0". The keyboard 200 is also capable of being adapted to encode other languages in various types, styles and print positions by means of the auxiliary keys 201–221. In particular, however, key 213 when actuated, operates the 10 × 10 array as a Chinese character data encoder. After key 213 is depressed, the first key struck on the 10 × 10 array of the keyboard represents a prefix code for a Chinese character, thus, designating one of the columns numbered 00–09 in row 104A of FIG. 1. The second keystrike on the 10 × 10 array indicates the suffix code from column 105A and thus designates the row whose intersection with the prefix-coded column identifies the whole Chinese character. For example, if the Chinese character meaning "sing" is to be printed out or encoded, the key 00 is struck to indicate the prefix code followed by the 01 key to indicate the suffix code. In FIG. 1 the designated symbol appears at the intersection of column 00 and row 01. Thus, the encoded output of the keyboard 200 representing the digits 00–01 is uniquely representative of the correct Chinese character. In addition, whether the Chinese character is a common word of simple construction or a little used word of complicated structure, the operation is the same and only requires the correct two keystrikes.

Each key bears a plurality of inscriptions to identify various meanings. As viewed in FIG. 2, the two-digit numeral in the upper left-hand corner of each individual key of the 10 × 10 array denotes the indexing code for either a prefix or suffix of a Chinese character. The main radical or root for a Chinese character shown in the lower left-hand corner denotes a special prefix. In the right-hand upper corner of the last three rows of keys at the bottom of the array in FIG. 2 are letters of the English alphabet. Th arrangement of the letters on the keys in these lower three rows corresponds to the conventional English typewriter organization (viz., QWERTYUIOP . . . ) to enable operation by a typist who is used to the English typewriter. The upper right-hand corners of the rest of the keys bear various symbols including Chinese numerals, the 12 Chinese year names and ten Chinese direction terms. In the lower right-hand corner of each key is a special Japanese alphabet in the form known as katakana. If Japanese character data is to be processed, the Japanese alphabet key 214 at the left side of the keyboard 200 would be depressed before encoding the Japanese information.

Figure 3:
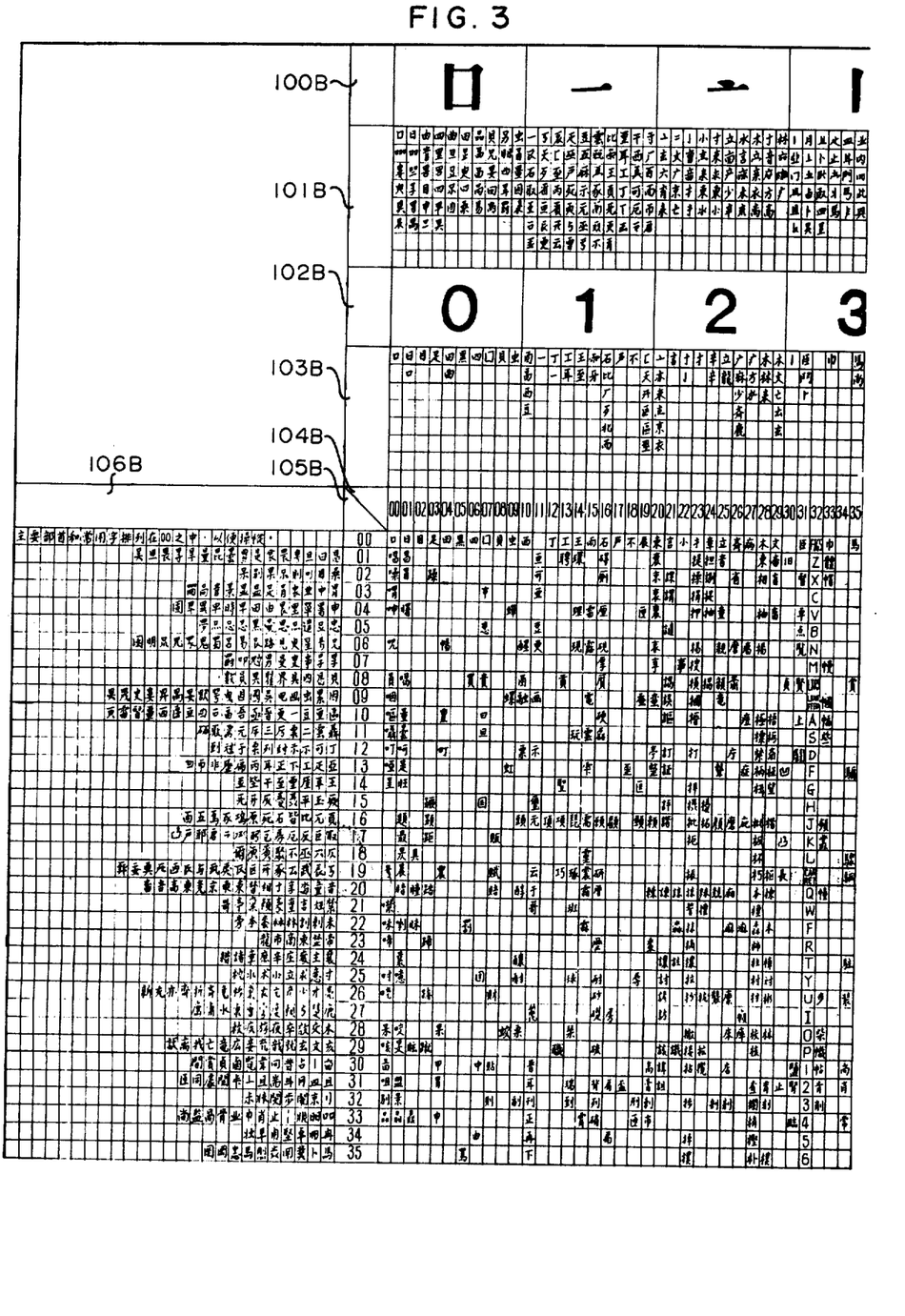
Figure 3A:
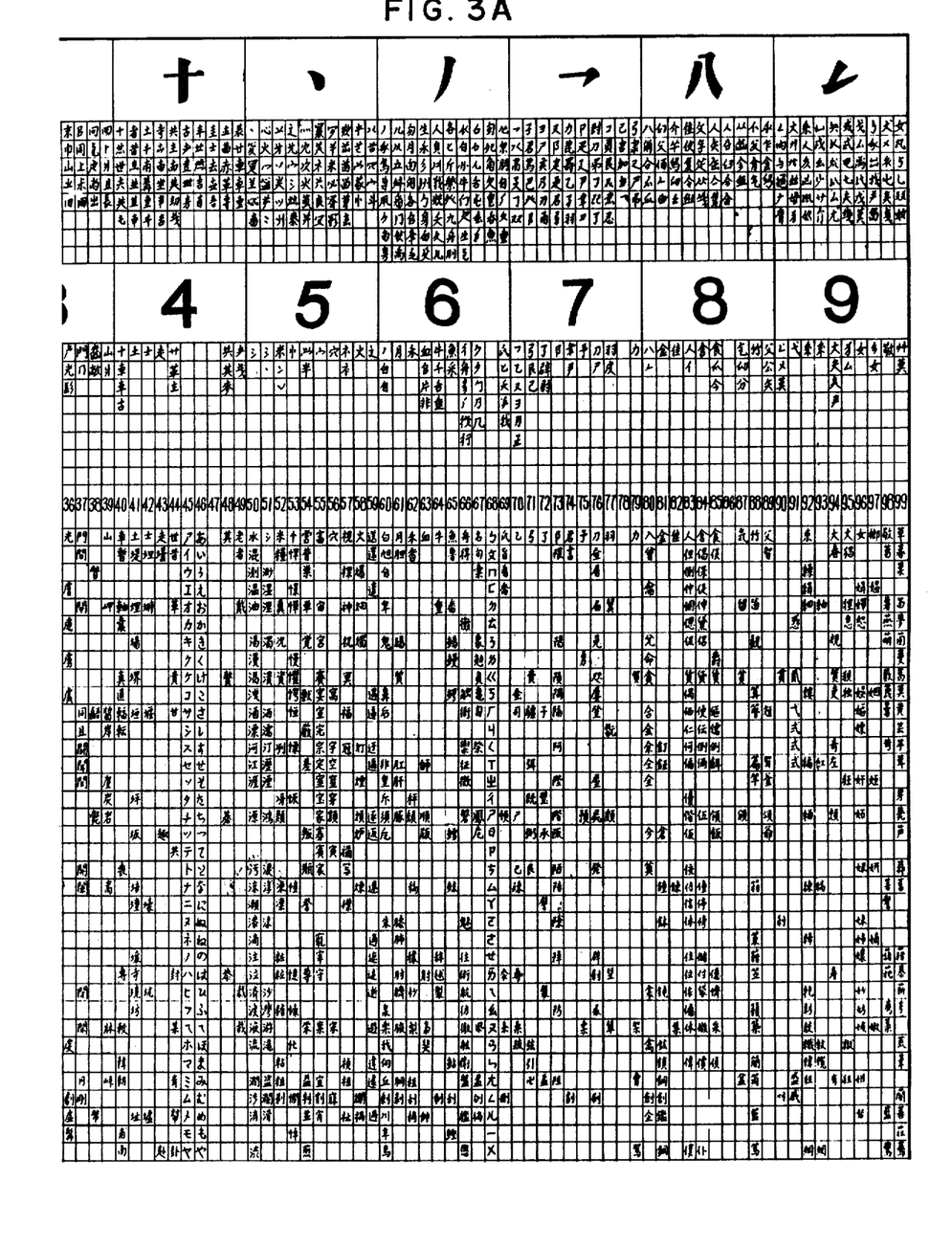
Figure 3C:
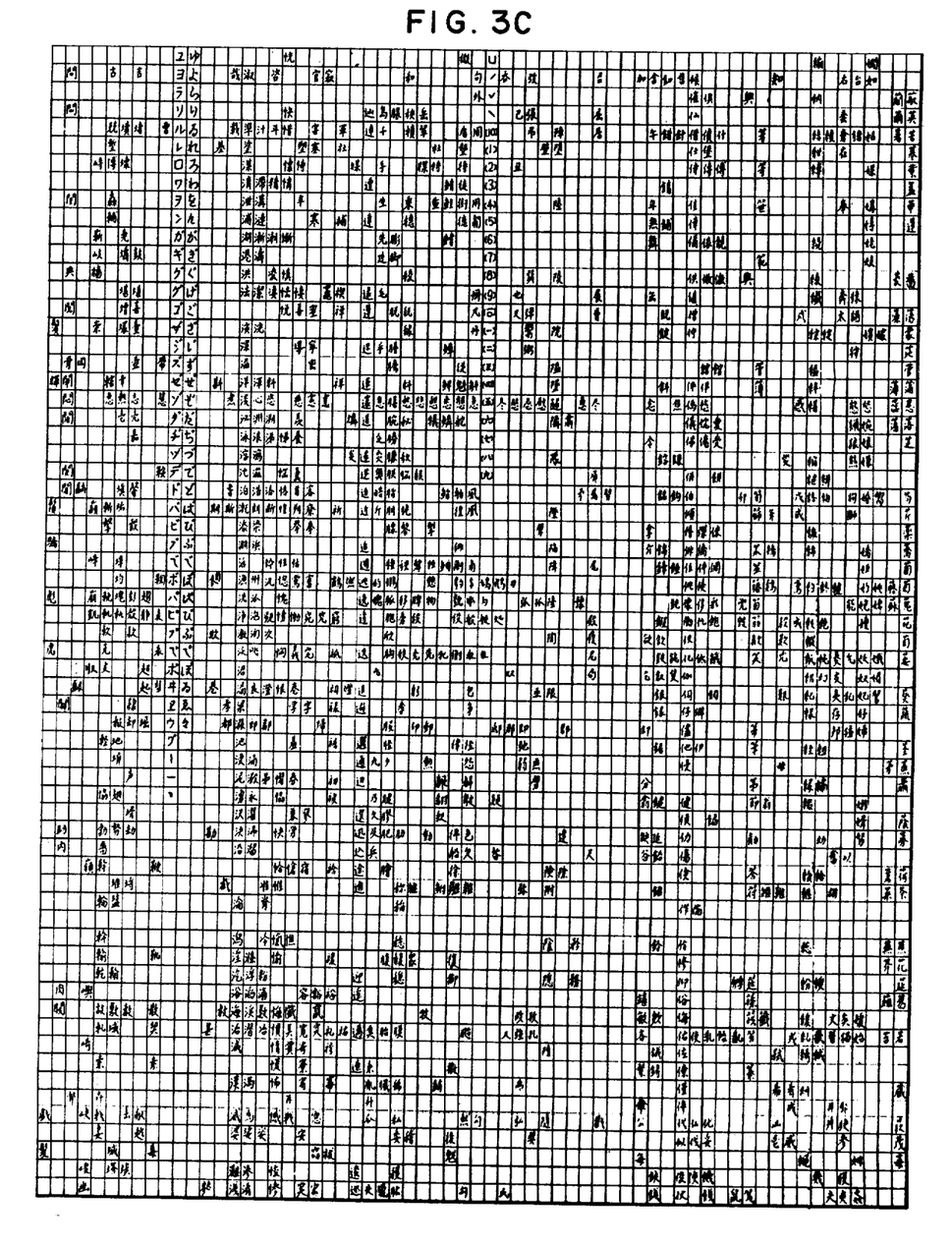

Some commonly used Chinese characters belong to the Japanese style or Japanese field of characters and in FIG. 3 a character arrangement similar to that of FIG. 1 is shown for Chinese characters written in the Japanese style. Because the Japanese style comes from a different source, Chinese characters of the Chinese style and Japanese style cannot be organized in the same pattern. However, the corresponding portions of the ten thousand space matrices in both FIGS. 1 and 3 are designated by the same numerals for the purpose of comparison.

The other keys on the left-hand side of the 10 × 10 array of the keyboard 200 are used for specifying different languages. In particular, key 215 is for English, key 216 for German, Key 217 for French, key 218 for Siamese, key 219 for Korean, 220 for Vietnamese, and 221 for Spanish. The buttons 211 and 212 form an on/off switch.

Besides the alphabet or language selection provided by the keys 213–221, keys 201–210 on the right-hand side of the keyboard 200 perform various auxiliary functions for indicating style, size and special character forms. In particular 201 is for Roman sytle print, 202 for Snug type, 203 for boldface and 204-208 for various sizes of characters from No. 6 to No. 10 type size for printing out any size or style of any language from the keyboard as desired. Key 209 is an auxiliary key for positioning the desired character in a selected position and key 210 is a common use key. Keys 209 and 210 may be used to provide access to an auxiliary stored program which can be used to specify further instructions as desired in the encoded output.

The keyboard encoding system of the present invention, in addition to serving as a universal language data processing device, can be applied to various conventional machines, such as typewriters, telegraphic equipment, phototype-setting apparatus, and teletype photoprinting devices. The encoded output of the keyboard 200 can be adapted to any storage medium such as magnetic tape or paper tape and can be easily converted to the international telegraphic code (morse code) or similar systems. Therefore, the system is very convenient for application to international communication systems. In operation, the speed of character print out will be on the order of 60 to 80 words per minute. The output device which converts the encoded output of the keyboard 200 to printed copy may be of any type of conventional automatic character indexing and setting processing equipment.

Figure 4:
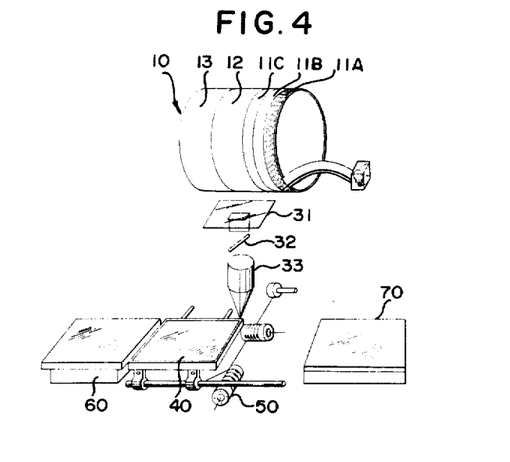
FIG. 4 is a schematic representation of a perspective view of an automatic phototype-setting system according to the invention.
Figure 5:
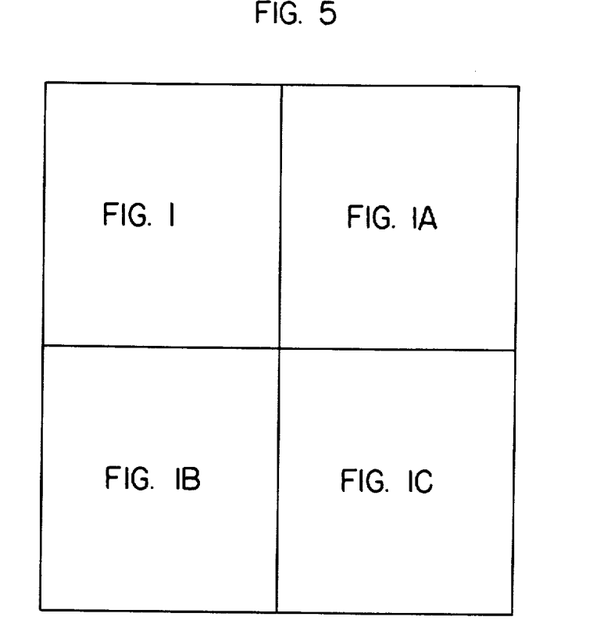
FIGS. 5 and 6 are diagrams indicating how to assemble the FIGS. of 1, 1A, 1B, 1C and FIGS. 3, 3A, 3B, 3C, respectively.
Figure 6:
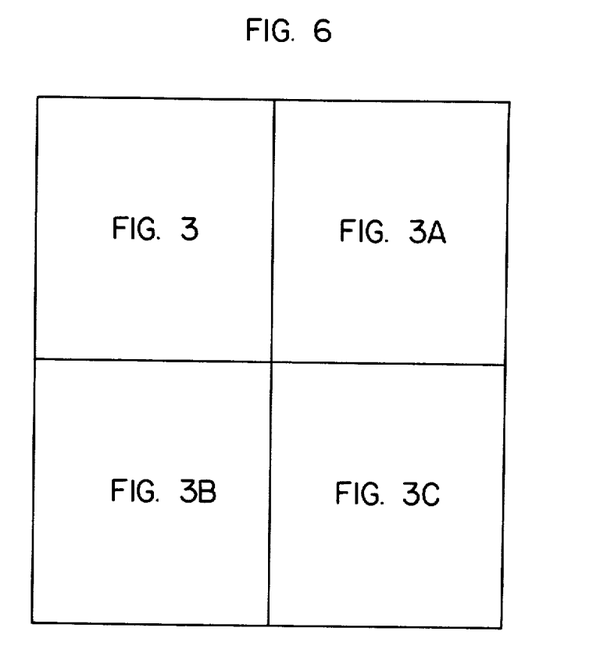

FIG. 4 depicts a schematic view of a preferred embodiment of an automatic phototype-setting system for use in connection with the keyboard of FIG. 2. Character patterns corresponding to the 100 × 100 character positions of FIG. 1 are individually placed on a master drum 10. The drum 10 comprises a transparent cylinder on which microfilm strips bearing character images are circumferentially mounted. A flash lamp 20 and light conductor arrangement cause light to be shined through the circumference of the drum from the inside at a particular point to illuminate the characters. The drum 10 is rotatable about its cylindrical axis and is also translatable axially to illuminate different ring-like sections 11, 12 and 13. Section 11 is provided for the Chinese character pattern, section 12 for a Japanese character pattern and section 13 for a western character pattern, for illustration. Each section is divided into three subsections, such as 11A, 11B and 11C representing respectively Roman or block style, snug type, and boldface for Chinese characters. Each subsection of a character pattern contains five parallel ring-like film strips. Each film strip contains about 10,000 characters, where the first film strip represents characters in common use, and the second film strip represents little used character patterns. For clarity, five film strips are shown only in subsection 11A and the rest of the subsections 11B, 11C are omitted from the drawing. Section 13 may store up to fifty thousand western characters in accordance with the principle discussed above.

When a key indicating a prefix code for a particular Chinese character is pressed, the desired character set on the character drum 10 will be rotating at high speed. This rotation does not stop until after a second key is pressed designating the whole character and that character which is designated has been rotated to a predetermined position. At that point the drum 10 is instructed to stop, the flash lamp 20 goes "on" and the desired character is projected onto a film 40 to form a character image thereon through the optical system comprising a point lens 31, mirror 32 and projecting lens 33. The film 40 can be moved in two orthogonal directions to place the character at a certain position on the film by means of an electric pulse motor 50. Element 60 supplies fresh film plates for exposure and element 70 represents a means for receiving and storing the film plates after exposure.

Those skilled in the art will recognize that the output device for use in connection with the character designation system illustrated in connection with FIGS. 1, 2 and 3 may also be formed by a flying spot scanning system. The desired character pattern is displayed on the cathode ray tube following two keystrikes indicating the prefix and suffix of a particular character. The common factor in any output system chosen for use in connection with the keyboard 200 will be that actual registration, display or projection of the character will await the second keystrike. In other words, the first keystrike information will be stored until the second keystrike, at which time, the entire character having been designated, the corresponding character will be displayed and printed. Instead of using photographic composition systems, direct typewriting systems can also be used in connection with the invention. For example, in such a system the character drum 10 in FIG. 4 would be replaced by individual character discs having a plurality of type faces formed around the periphery thereof. If the discs are large enough to accommodate 1,000 type faces each, the minimum number of discs required for Chinese character data processing would be 10.

In summary, the character matrix of the present invention is basically arranged by providing a prefix indexing code for a plurality of columns and a suffix indicating code for a plurality of rows in accordance with primary character elements of the Chinese written language which serve as an alphabet from which Chinese characters are composed by special combinations of the primary character elements and related variants thereof. In this manner, each Chinese character may be specified by a four-digit indexing code by means of a special keyboard organized to take advantage of the matrix arrangement. Through the existing techniques of microfilm projection systems, automatic phototype setting and printing may be carried out in a simple manner using the coding system of the invention. The combination of compatible output printing devices with the input encoding system of the invention not only allows quick keyboarding but also a high speed print out of language data.

Those skilled in the art will recognize that the input system according to the invention may be adapted to many other types of information processing systems such as typewriters, telegraphic equipment, telex equipment, teletypewriters, teletype-setting and printing machines. In addition the character storage volume of the present invention represented by the keyboard arrangement in FIG. 2 is practically unlimited. Storing up to 150,000 Chinese characters, 150,000 Japanese characters, both of which include 50,000 roman style, 50,000 Snug type and 50,000 boldface characters is possible, along with several ten thousands of western language characters without requiring additional keyboard capacity.

It will be understood that various changes in the details, materials, steps and arrangements of parts which have been herein described and illustrated in order to explain the nature of the invention, may be made by those skilled in the art within the principle and scope of the invention as expressed in the appended claims.

I claim:

1. An ideographic character selection system, comprising keyboard means for indicating an operator's selection of a four-digit number composed of four consecutive decimal integers, means responsive to said keyboard means for generating a prefix code, corresponding to the first two digits, and a suffix code, corresponding to the second two digits, together designating a specific ideographic character having a corresponding prefix portion and suffix portion each of which is composed of two subportions etymologically related to respective ones of 10 primary character elements which are mnemonically suggestive of the respective decimal integers indicated by the operator, and electrical output means responsive to said prefix and suffix code for selecting and displaying in a predetermined location a graphic representation of said designated character.

2. The system of claim 1, wherein said characters are Chinese characters, and the primary character elements corresponding respectively to the digits 0, 1, 2, 3, 4, 5, 6, 7, 8, and 9 as follows:

3. The system of claim 2, wherein said keyboard means includes an array of 100 numbered keys in numerical order such that said four-digit number may be indicated by two consecutive keystrikes corresponding to said prefix and suffix codes, respectively.

* * * * *